United States Patent Office 3,028,433
Patented Apr. 3, 1962

3,028,433
PROCESS FOR IMPROVING POLY-
PROPYLENE GLYCOLS
Donald G. Leis and Robert J. Knopf, St. Albans, W. Va.,
assignors to Union Carbide Corporation, a corporation of New York
No Drawing. Filed Sept. 9, 1959, Ser. No. 838,847
1 Claim. (Cl. 260—615)

This invention relates to the compositions and process for obtaining stabilized and improved polypropylene glycols and to the compositions and process for the production of polyurethane elastomers having superior tensile strength properties. More particularly, this invention is directed to compositions and process of producing improved polypropylene glycols by the treatment of polypropylene glycols with aqueous potassium permanganate and to compositions and process for the preparation of polyurethane elastomers, having superior tensile strength properties, by the reaction of said glycols with arylene diisocyanates.

Polypropylene glycols are well known in the art and have been used primarily as functional fluids, lubricants for brake fluids, hydraulic fluids and the like. In recent years, there has been an increasing interest in the use of polypropylene glycols as starting materials for the production of polyurethane foams and elastomers. It is well known that polypropylene glycols are subject to oxidative decomposition or degradation upon prolonged exposure to air in conditions which exist in holding tanks, tank cars and other containers used in the storage of chemical compounds. On oxidation polypropylene glycols produce undesirable by-products which adversely affects the production of polyurethane elastomers and the use of said glycols for functional fluids.

A process has been discovered for stabilizing polypropylene glycols against additional oxidation by the treatment with aqueous potassium permanganate. Furthermore, a process has been discovered for improving polypropylene glycols used as starting materials for the production of polyurethane elastomers having superior tensile strength, which comprises adding a minor amount of aqueous potassium permanganate to polypropylene glycol, heating the resulting solution in the temperature range from 20° C. to 90° C. and preferably from about 25° C. to about 50° C. under an inert atmosphere essentially free of elemental oxygen, for example, nitrogen, carbon monoxide, carbon dioxide and the like for a period of from about one-half to two hours, followed by heating under reduced pressure for a period of time sufficient to remove the water present by distillation and recovering the improved polypropylene glycol. Further poylurethane elastomers having superior tensile strength properties and their method of production have been discovered in the reaction of the aforementioned potassium permanganate treated polypropylene glycols with an excess of organic polyisocyanate.

It is indeed surprising that in view of the well known oxidation tendency of polypropylene glycols that the addition of a minor amount of aqueous potassium permanganate, a well known oxidizing agent, will stabilize said compounds against further oxidation. It has been observed further that improved polypropylene glycols are produced for use as starting materials in the production of polyurethane elastomers having superior tensile strength properties. It is, indeed, unusual that in the treatment of the polypropylene glycols with potassium permanganate, that undesirable oxidation products were not obtained. It is well known that polypropylene glycols are readily oxidized upon exposure to air forming undesirable oxidation products detrimental in obtaining desirable physical characteristics in the production of polyurethane elastomers. Yet, the potassium permanganate treated polypropylene glycols when reacted with isocyanates produced polyurethane elastomers having superior tensile properties to those produced from untreated polypropylene glycol.

The polypropylene glycols, which are stabilized by the addition of aqueous potassium permanganate and also improved by the potassium permanganate treatment for use in the preparation of polyurethane elastomers having superior tensile strength properties, can possess molecular weights in the range from 1000 to 4000, with a preferred range of from 1000 to 3000.

The minor amounts of potassium permanganate which can be used in this invention can range from about 0.15 to 2.8 percent by weight of polypropylene glycol. The preferred ranges of potassium permanganate vary with the average molecular weight of the polypropylene glycol, for example:

| Average Molecular Weight of Polypropylene Glycol | Preferred Ranges of Potassium Permanganate (percent by weight of polypropylene glycol) |
|---|---|
| 1,000 | 0.15 to 0.3 |
| 2,000 | 0.65 to 1.3 |
| 3,000 | 1.25 to 2.5 |
| 4,000 | 1.4 to 2.8 |

The potassium permanganate is added to the polypropylene glycol in an aqueous solution wherein the preferred amount of water present exceeds at least 20 weight percent of the total amount of polypropylene glycol, although the amount of water present is not necessarily critical. In the use of the polypropylene glycols, stabilized by the treatment of aqueous potassium permanganate, it is required to remove the water in the combined mixtures either by distillation or other separation means. It is required to filter the polypropylene glycols after the treatment process with potassium permanganate has been completed so as to remove any residue which may have been formed or added during the process. The filtration of the residue which may have been formed or added during treatment may be carried out prior to the removal of water, if desired.

Polyurethane elastomers are readily prepared by charging polypropylene glycol and the arylene diisocyanate to a reaction kettle and heating in the range of 100 to 160° C. under reduced pressure until a viscous product is formed. The material is continually stripped of low boiling materials in order to prevent bubbles forming in the mass. After the above heating treatment is completed, the temperature is reduced or maintained to the temperature range of 100° C. to 130° C. and the pressure raised to 1 atmosphere. To the reaction kettle is then added a cross-linking agent such as 1,4-butandiol. The contents in the reaction kettle are stirred until the cross-linking agent has been thoroughly dispersed and the resultant mixture is poured into a mold. The mold containing the polymer is heated to 110° C. and held at that temperature for one hour. The polymer is removed and cured. The polypropylene glycols used in the aforementioned procedure can have a molecular weight ranging from 1000 to 4000. To produce the polyurethane elastomers of this invention, the amount of the arylene diisocyanate employed will vary depending upon the particular diisocyanate and also the polypropylene glycols employed. It has been found that to produce elastomers of this invention the mol ratio of the diisocyanate to polypropylene glycol from 1:1 to about 2:1 are preferred.

A polymerization catalyst can be used in the aforementioned polyurethane elastomer preparation but is not required for the polymerization of arylene diisocyanate and the treated polypropylene glycol. The catalyst is merely used to speed up the reaction.

Any of a wide variety of arylene diisocyanates may be employed in place of those especially used to illustrate the invention in the following examples; the common examples of this class being m- and p-phenylene diisocyanates; 2,4- and 2,6-toluene diisocyanates; 2,3,5,6-tetramethyl-para-phenylene diisocyanate; o-, m-, p-xylene diisocyanates; 4,4'-diphenylene diisocyanate; 3,3'-dimethyl-4,4'-diphenylene diisocyanate, diphenylmethane-4,4'-diisocyanate and the like.

The following examples illustrate the present invention:

EXAMPLE I

Five hundred pounds of refined polypropylene glycol having an average molecular weight of 2025 was charged to a glass-lined reactor and 4.3 pounds of potassium permanganate slowly added as a one percent aqueous solution. During this addition, the polypropylene glycol was continuously stirred while being protected with an inert atmosphere of nitrogen to minimize extraneous oxidation. After all the potassium permanganate had been added, stirring was continued for two hours to insure complete reaction. Refining was accomplished by treatment with one weight percent (5 pounds) of a highly adsorptive synthetic hydrous magnesium silicate used for purposes of neutralization and decolorization for ten hours at 90° C. During the refining, vacuum was applied to remove water. To insure that all the water had been removed, the reactor was held at 90° C. and 5 millimeters of mercury pressure for one hour, after which the polypropylene glycol was filtered, recovering the treated polypropylene glycol.

EXAMPLE II

A solid elastomer was prepared by charging 92.0 grams of the polypropylene glycol, prepared in Example I, and 40.0 grams of diphenylmethane-4,4'-diisocyanate to a reaction kettle and heating to 135° C. at 3 to 5 millimeters pressure. After 1 hour of this treatment, the temperature was reduced to 120° C. and the pressure raised to 1 atmosphere. To the reaction kettle was then added 9.0 grams of 1,4-butandiol, which serves as a cross-linking agent. The kettle contents were stirred until the butandiol was thoroughly dispersed, and the molten polymer was poured into a mold. The mold containing the polymer was heated to 110° C. and held at that temperature for 1 hour. The polymer sheet was removed and cured an additional 17 hours at 110° C.

The polymer sheet was tested for tensile strength and elongation according to the test method of the American Society of Testing Materials D–412–51T. The results are found in Table I.

EXAMPLE III

The procedure of Example II was repeated using polypropylene glycol having an average molecular weight of 2025 without the potassium permanganate treatment of Example I. The polymer sheet was tested for tensile strength and elongation according to the test method of the American Society of Testing Materials D–412–51T. The results are found in Table I.

*Table I*

RHEOLOGICAL PROPERTIES OF POLYURETHANE ELASTOMERS

| | Tensile Strength at Break [a] pounds per square inch | Elongation at Break [a] percent |
|---|---|---|
| Elastomer made from Untreated Polypropylene Glycol—Example III | 515 | 401 |
| Elastomer made from Treated Polypropylene Glycol—Example II | 826 | 420 |

[a] Each elastomer was tested five times and the average is recorded.

In an analogous manner, as Example II, potassium permanganate treated polypropylene glycols having average molecular weights of 1000, 3000, and 400 respectively wherein each said glycol is reacted separately with individual arylene diisocyanates such as meta-phenylene diisocyanates; para-phenylene diisocyanates; 2,4-toluene diisocyanates; 2,6-toluene diisocyanates; 2,3,5,6-tetramethyl-para-phenylene diisocyanate; ortho-xylene diisocyanates; meta-xylene diisocyanate; para-xylene diisocyanate; 4,4'-diphenylene diisocyanate; 3,3'-dimethyl-4,4'-diphenylene diisocyanate and diphenylmethane-4,4'-diisocyanate, obtaining polyurethane elastomers having superior tensile strength properties.

EXAMPLE IV

To a 1000 milliliter, round-bottom, three-neck kettle equipped with a thermowell and stirrer was added 500 to 600 grams of potassium permanganate treated polypropylene glycol of Example I. To similar equipment is charged untreated polypropylene glycol having an average molecular weight of 2025. In each kettle, with the stirrer blade rotating at 150±10 rotations per minute, the sample is heated to 60° C. with one neck of the kettle vented to the atmosphere. From each kettle samples were taken and analyzed for a conventional saponification number to measure the amount of oxidation products produced. The following results were obtained:

| Time, hours | Untreated Polypropylene Glycol Saponification No. | Potassium Permanganate Treated Polypropylene Glycol Saponification No. |
|---|---|---|
| 0 | 0.1 | 0.2 |
| 2 | 0.2 | 0.3 |
| 8 | 0.5 | 0.3 |
| 11 | 0.7 | 0.3 |
| 15 | 1.5 | 0.3 |

The saponification number measures the presence of oxidation products such as acids and esters produced by the oxidation of polypropylene glycols on exposure to air. The saponification number of the treated polypropylene glycol remains essentially constant over a period of 15 hours. The saponification number of the untreated polypropylene glycol shows a marked increase over a period of 15 hours indicating that oxidation on air exposure and occurred. The potassium permanganate treated polypropylene glycols are stabilized against air oxidation.

The elastomer prepared from polypropylene glycol which was treated with potassium permanganate has an improved tensile strength which is from 1.3 to 2 times that of the elastomer prepared from the untreated polypropylene glycol. The elongation at break for the treated polypropylene glycol elastomer is slightly better than the untreated polypropylene glycol elastomer. A superior polyurethane elastomer has been prepared by using polypropylene glycol treated with potassium permanganate as a starting material.

The polyurethane elastomers prepared according to this invention have many varied uses. They may be employed in the preparation of tires, inner tubes, belts, hose and tubing, wire and cable jackets, footwear, sponges, coated fabrics and wide variety of coated or molded articles.

What is claimed is:

A process for obtaining improved polypropylene glycols, stabilized against air oxidation, which comprises adding aqueous potassium permanganate to polypropylene glycol having a molecular weight between 1000 and 4000, heating the resulting solution in the temperature range from 20° C. to 90° C. under reduced pressure for a period of time sufficient to remove the water present by distillation, removing the insoluble material formed and recovering the treated polypropylene glycol.

References Cited in the file of this patent

UNITED STATES PATENTS

| | | |
|---|---|---|
| 1,536,544 | Willkie | May 5, 1925 |
| 2,915,496 | Swart et al. | Dec. 1, 1959 |